United States Patent [19]

Busse

[11] Patent Number: 5,203,738
[45] Date of Patent: Apr. 20, 1993

[54] COMBINE FOR RAPID HEAD CHANGE

[75] Inventor: Steven R. Busse, Moorhead, Minn.

[73] Assignee: American Cyanamid Company, Stamford, Conn.

[21] Appl. No.: 738,821

[22] Filed: Aug. 1, 1991

[51] Int. Cl.$^5$ .................. A01D 47/00; A01F 12/10
[52] U.S. Cl. ........................... 460/16; 460/21; 460/119
[58] Field of Search .............. 460/16, 20, 21, 119, 460/149, 150; 56/14.5, 14.6

[56] References Cited

U.S. PATENT DOCUMENTS

| 4,150,525 | 4/1979 | De Busscher et al. | 460/119 X |
| 4,846,198 | 7/1989 | Carnewal et al. | 460/21 |
| 4,972,664 | 11/1990 | Frey | 56/15.8 X |

Primary Examiner—Terry Lee Melius
Attorney, Agent, or Firm—Mark P. Stone

[57] ABSTRACT

A combine of the type in which a harvesting head permanently affixed to a feeder housing is modified to permit rapid and simple replacement and exchange of the head without removing the feeder housing from the combine. The head is provided with openings for receiving complementary members extending upwardly from the feeder housing for initially removably mounting the head to the housing. Lower attachment elements are provided on the sides of the feeder housing, and an adjustable connector element secures the lower head portion to the lower feeder housing portion. Guide elements on the head assure ready alignment between the housing and the head during replacement or exchange of the head, and portions of the feeder housing are equipped with reinforcement elements to increase its structural integrity. The feeder housing and the head each include sprockets for an endless drive chain, and the length of the chain is adjusted to accommodate different heads exchangably mounted to the feeder housing. The modified combine enables rapid exchange of combine heads in a simple and safe procedure which does not require removal of the feeder housing from the combine.

20 Claims, 13 Drawing Sheets

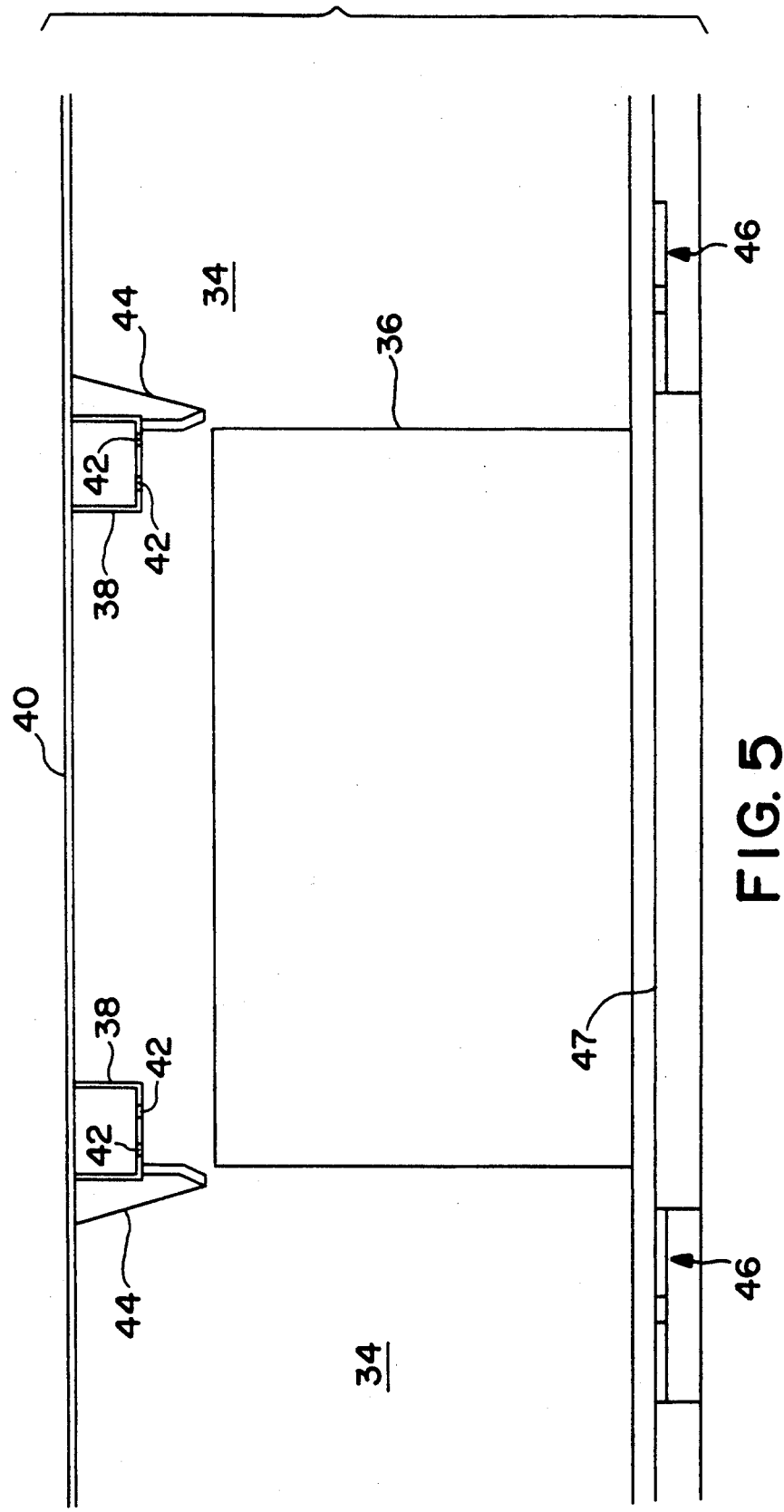

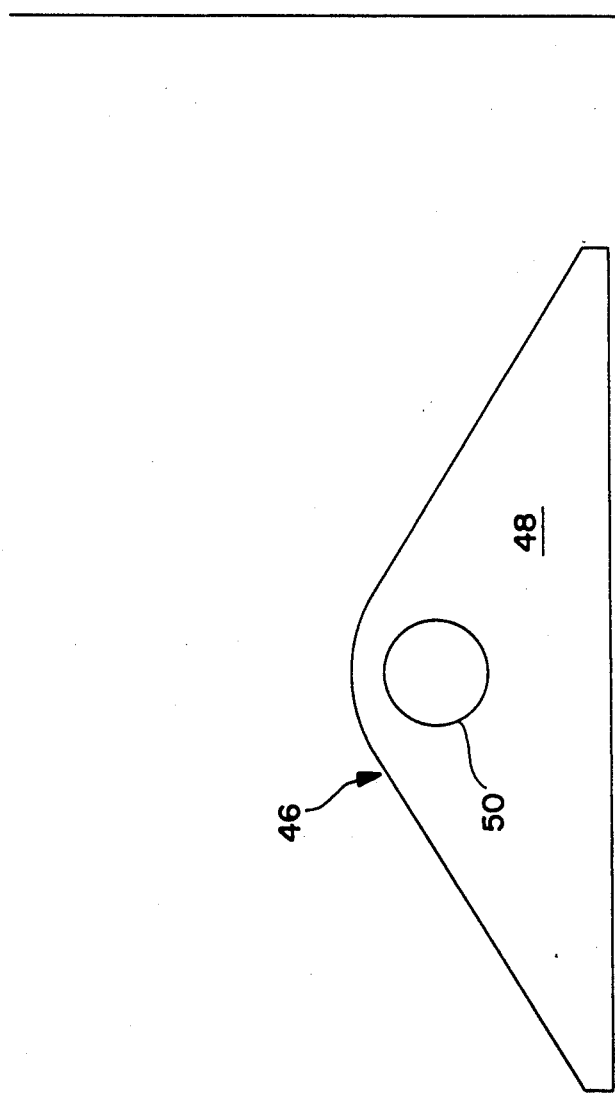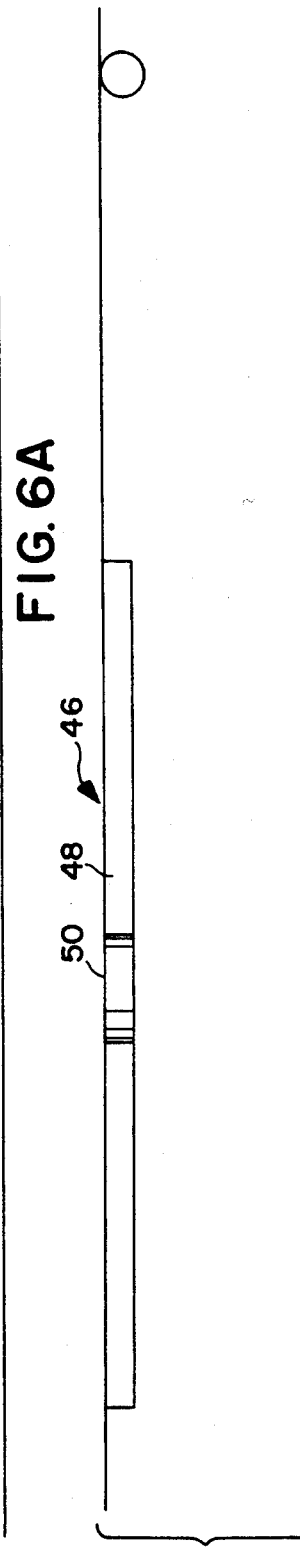
FIG. 6A
FIG. 6B

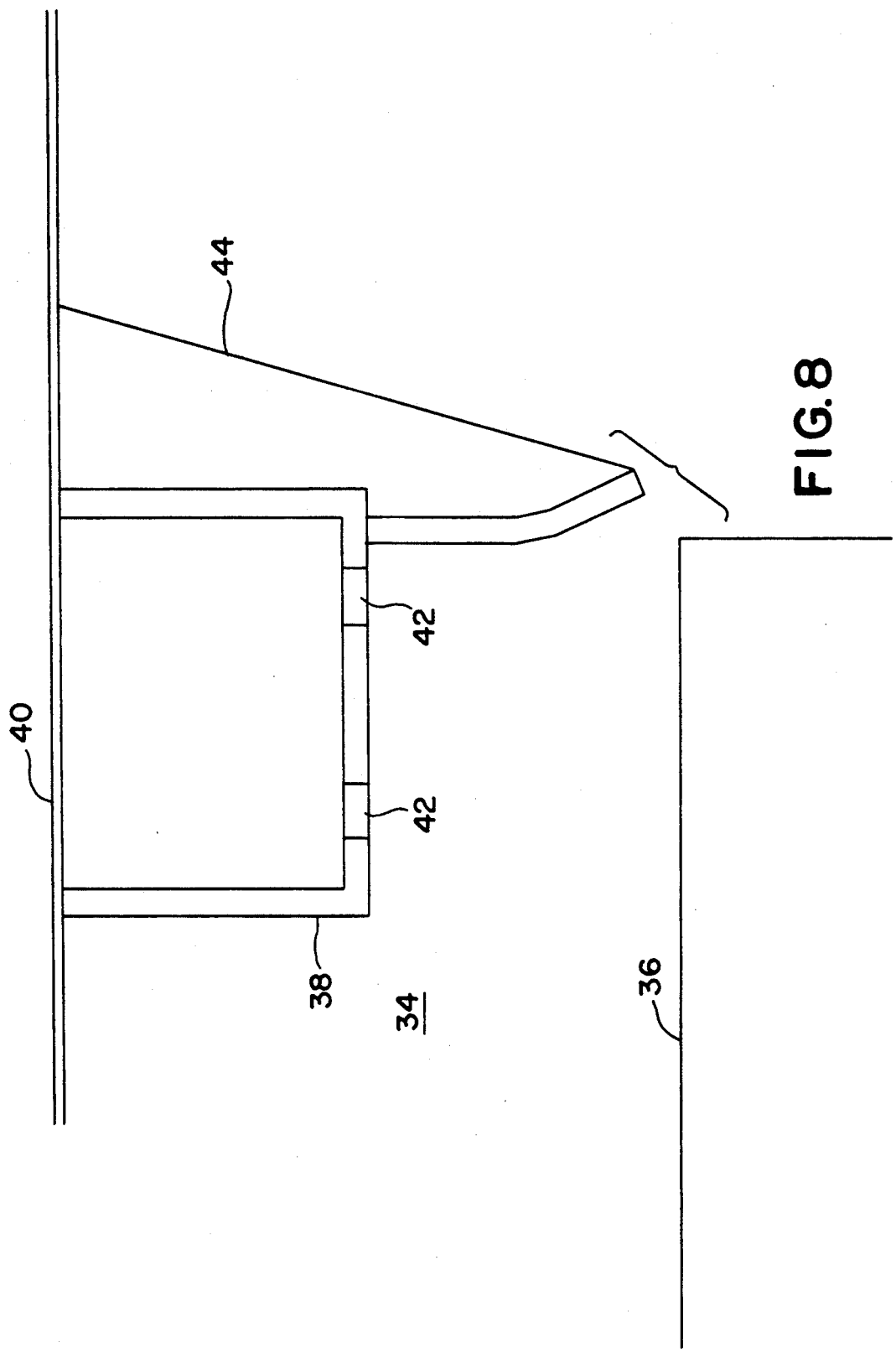

COMBINE FOR RAPID HEAD CHANGE

BACKGROUND OF THE INVENTION

Smaller combines, such as that exemplified by the combine sold under the name Massey Ferguson 8, and produced by Massey-Ferguson Manufacturing Limited, include a feeder housing having a harvester head permanently attached thereto. This type of combine is considered to be relatively small, having an overall length of approximately 220 inches and an overall width of approximately 80 inches.

As a result of the permanent connection between the harvester head and the feeder housing of smaller combines such as the Massey Ferguson 8, it is necessary to completely remove the feeder housing-head structure from the combine when it becomes necessary to replace or exchange heads. For example, it is not uncommon for a farmer to use a small combine to harvest several different crops including corn, soybean and grain, each of which requires a different head. Exchanging heads on a small combine in which the head is intended to be permanently mounted to the feeder housing is a time consuming, burdensome procedure which requires extensive mechanical disassembly of the combine to remove the feeder housing. Once the housing/head structure is removed, either a new housing/head structure having the desired head must be re-mounted to the combine or, in the alternative, the head must be removed from the feeder housing, the replacement head must be mounted to the feeder housing, and the feeder housing/head structure must be re-mounted to the combine. In either event, the procedure for exchanging or replacing a head is complicated and requires many mechanical and hydraulic connections and disconnections; is time consuming and requires the labor of at least two people working several hours to remove and replace the feeder housing/head structure from the combine; and is potentially dangerous because it requires personnel to be positioned between the combine and the feeder housing during dismounting and re-mounting thereof.

Although larger scale commercial combines, as for example the 9400 Combine manufactured by the John Deere Company, may be equipped from the factory with means for replacing harvester heads, smaller scale combines do not include this feature. Therefore small farms having only the smaller type combines discussed above must resort to the complicated and dangerous time consuming procedure when one harvester head is exchanged for another.

It is the primary object of the present invention to provide an improved combine of the type generally discussed above (including a harvester head intended to be permanently mounted to a feeder housing), in which the combine includes means for rapidly, simply, efficiently and safely exchanging one head for another without removing the feeder housing from the combine.

It is a further object of the invention to provide improved and modified feeder housings and harvester heads which are employed in the improved combine for facilitating the exchange of one harvester head for another.

It is still further object of the invention to provide a method of modifying an existing combine in which the feeder housing and harvester head are intended to be non-removably coupled together, to provide structural means for rapidly, efficiently, and safely exchanging one head for another without removing the feeder housing from the combine and which eliminates the complicated mechanical manipulations otherwise required for exchange or replacement of heads.

Further objects of the invention will become apparent to those skilled in the art from the following discussion in conjunction with the drawings.

SUMMARY OF THE INVENTION

The present invention is directed to an improved combine, and a method of retrofitting existing combines having harvester heads non-removably mounted to feeder housings, such that the head may be replaced or exchanged without removing the feeder housing from the combine. The improved combine includes openings defined in a harvester head for removably receiving aligned members extending upwardly from the top of the feeder housing. In this manner, the head is initially removably mounted to the feeder housing. The head includes guide means provided thereon for assuring that the head is in proper aligned position relative to the feeder housing during the initial mounting procedure. The bottom of the feeder housing includes one or more laterally extending attachment brackets for removably securing the head to corresponding attachment elements on the lower portion of the feeder housing via adjustable connector elements disposed therebetween. Reinforcement means are provided on the feeder housing, particularly along its vertically extending seams where it is attached to the head, for enhancing the structural integrity of the feeder housing.

Sprocket wheels are provided on the feeder housing and the harvester head for supporting an endless drive chain for mechanically coupling the feeder housing and the head. The endless drive chain is readily removable from the respective sprockets on the feeder housing and the head during exchange of heads. The length of the endless drive chain may be adjusted by either adding or removing links to compensate for any variation in distance between the sprocket on the feeder housing and the sprockets on different exchangeable heads. This feature of the invention eliminates the need for a farmer to stock different sized belts for use with different exchanged harvester heads.

Preferably, the improved combine of the present invention has a hose connection between the feeder housing and the head including quick connect/disconnect nozzle means. A portion of a hose mounted to and extending from the feeder housing can be readily connected and disconnected from the portion of the same hose mounted to the head during removal and exchange of the head. In this manner, it is unnecessary to completely remove a unitary hose from the head or feeder housing during exchange or replacement of heads.

The present invention provides an improved combine including structure which facilitates the efficient and safe replacement and/or exchange of harvester heads from a feeder housing of a combine without removing the feeder housing itself. The replacement or exchange procedure may be accomplished in a safe and efficient manner in approximately thirty minutes by one person using only simple tools.

The present invention further provides a method for modifying pre-existing combines of the type in which a head is intended to be non-removably mounted to a feeder housing, and replacement or exchange of one head for another requires the complete removal of the housing/head structure from the combine. In accordance with the present invention, a pre-existing combine of the aforementioned type is retrofitted to include cooperating structure enabling exchange or replacement of the head without removing the feeder housing from the combine, in a safe and efficient manner which, as described above, can be accomplished safely by a single person using simple tools in a relatively short time interval.

Further details of the method and apparatus of the present invention will become apparent from the following detailed discussion of the preferred embodiments in conjunction with the drawings which are described as follows.

BRIEF DESCRIPTION OF THE DRAWINGS

FIG. 5 illustrates the rear wall of a grain head for mounting on the modified feeder housing in accordance with the present invention;

FIGS. 6A-6B illustrate a portion of the rear wall of the grain head of FIG. 5 showing a lower attachment element for mounting to the modified feeder housing in accordance with the present invention;

FIG. 8 illustrates, in perspective, a portion of the rear wall of the grain head of FIG. 5 showing a mounting bracket and guide element.

DISCUSSION OF THE BEST MODES FOR CARRYING OUT THE INVENTION

Figure 1A:
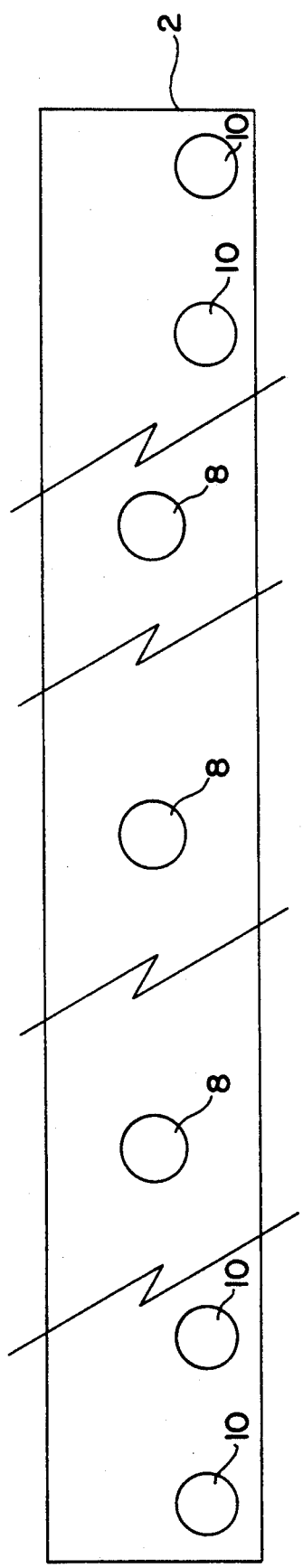
FIGS. 1A-1C illustrate different views of a modified feeder housing of a combine in accordance with the present invention.
Figure 1B:
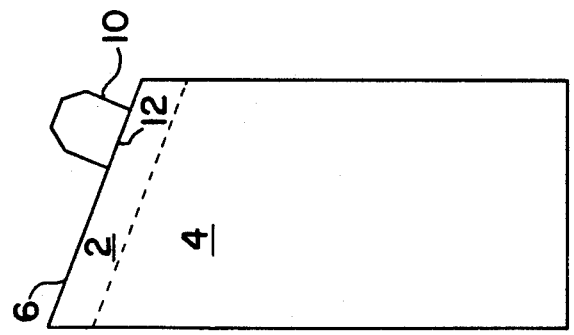
Figure 1C:
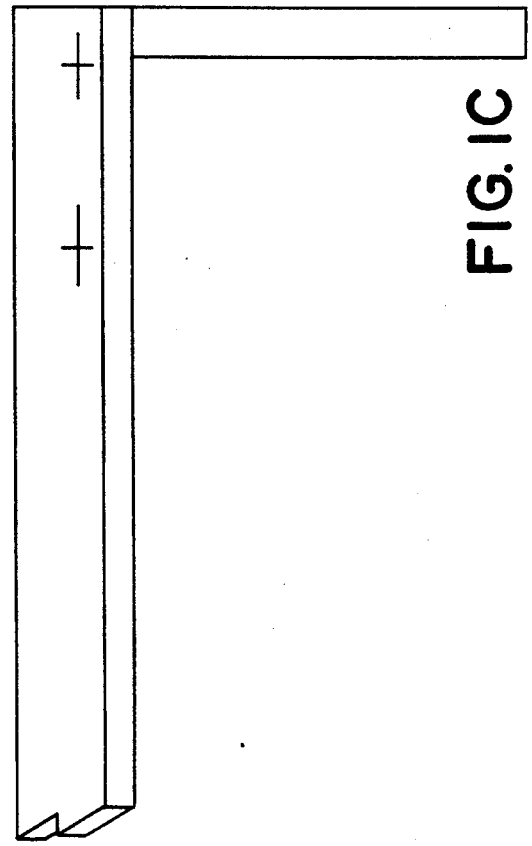

FIG. 1A-1C of the drawings illustrates a modified feeder housing of a combine in accordance with the present invention. A mounting bracket 2 is itself mounted within a feeder housing 4 of a combine beneath the top surface 6 of the feeder housing. Suitable mounting holes 8 are provided in the bracket for permanently securing the bracket to the inner surface of the top of the feeder housing. A plurality of mounting members such as pins 10 extend upwardly from the mounting bracket 2, and pass upwardly through suitably aligned openings 12 provided in the top 6 of the feeder housing 4. Accordingly, the pins 10, which are preferably formed from a durable metal, extend upwardly beyond the top surface of the feeder housing when the mounting bracket 2 is installed within the feeder housing. The mounting bracket, which can be a metal plate, is permanently bolted to the inner surface of the top of the feeder housing through the openings 8 in the bracket and through suitable aligned openings defined in the top of the feeder housing.

Figure 2:
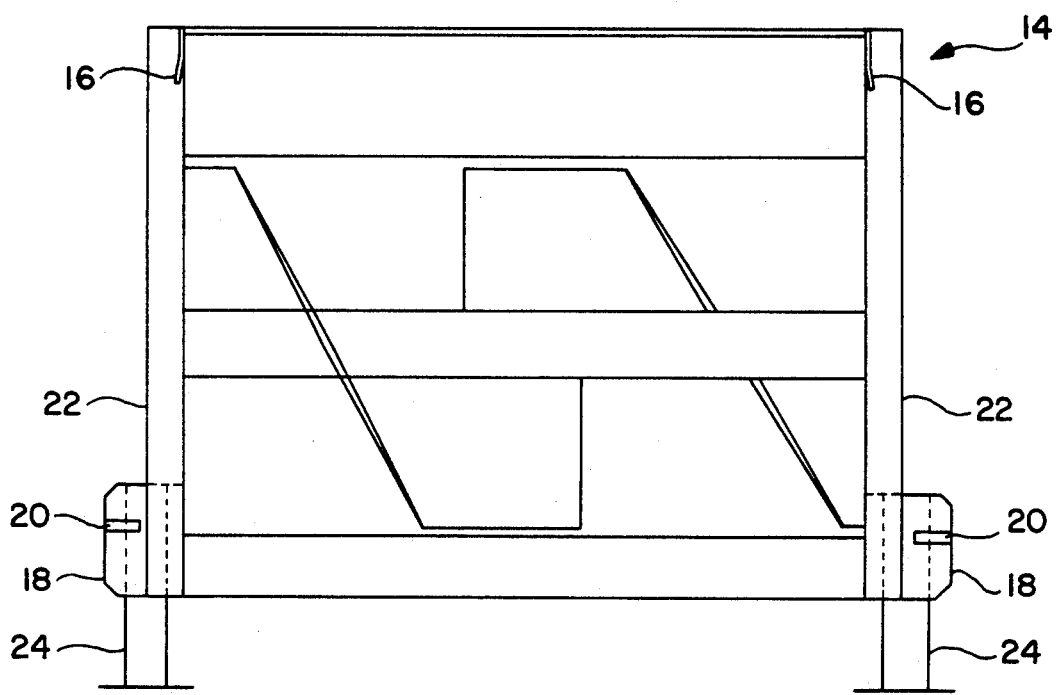
FIG. 2 illustrates a rear elevational view of a corn head adapted to be removable mounted to a feeder housing modified in accordance with FIG. 1.

FIG. 2 illustrates a rear elevational view of a corn head, generally designated as reference numeral 14, adapted for mounting to the modified feeder housing 4 shown in FIG. 1. Two laterally disposed guide elements 16 extend rearwardly and outwardly from the rear wall of the corn head 14 proximate to the top thereof for guiding complementary openings in the corn head into proper aligned position relative to the mounting members 10 extending upwardly from the feeder housing for receiving the mounting members in the openings in the head when the head is mounted to the feeder housing. The guide members are separated from each other by a distance which is substantially equal to the width of the front of the feeder housing. A pair of brackets 18 are laterally disposed at opposed sides of the lower portion of the rear wall of the corn head, and each bracket defines an attachment element 20 extending laterally beyond the opposed sidewalls 22 of the corn head 14. As will be discussed in greater detail below, the attachment elements 20 provide means for removably connecting and securing the lower portion of the corn head to corresponding attachment elements carried by the lower portion of the feeder head. A pair of vertical legs 24 extends downwardly from the corn head to support this structure in an upright position on the ground when the head is removed from the combine.

Figure 3:
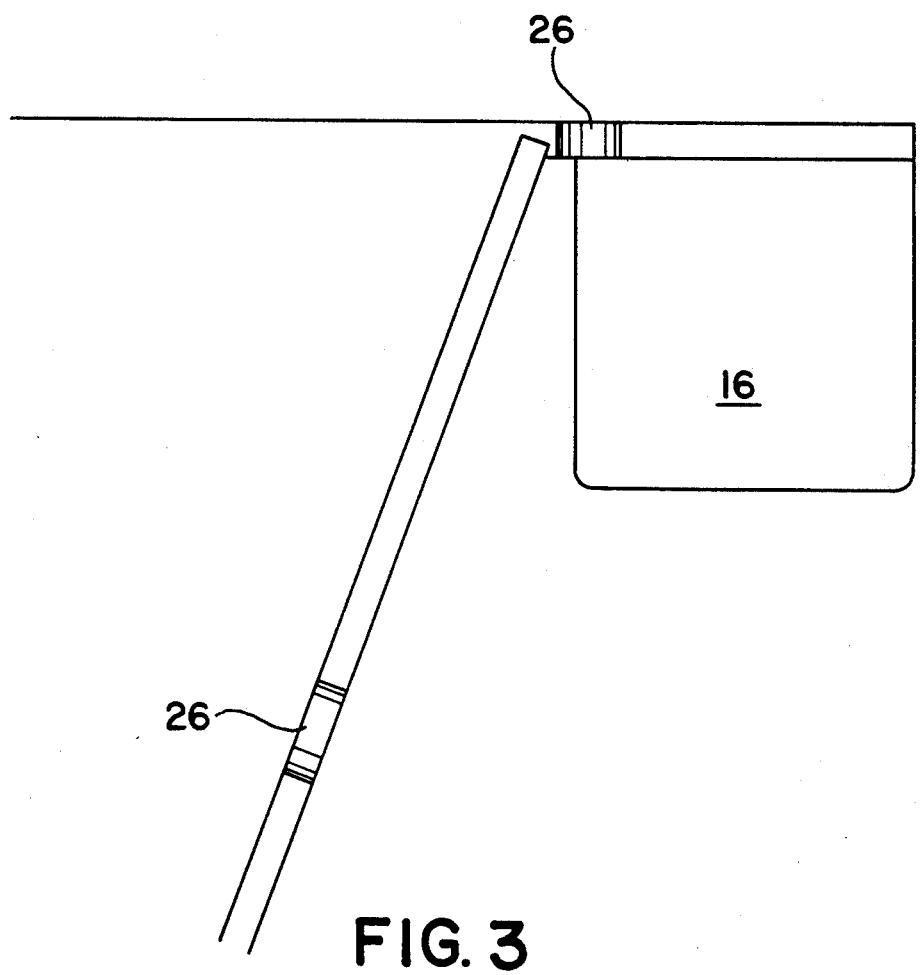
FIG. 3 of the drawing illustrates mounting holes and guide elements on the corn head of FIG. 2 for mounting the head to the modified feeder housing of FIG. 1.

FIG. 3 of the drawing illustrates, in greater detail, one of the guide elements 14 extending from the backside of the cornhead 14, and two mounting openings 26 provided in the cornhead for receiving the upwardly extending mounting members 10 of the feeder housing 4 (FIG. 1).

Figures 4A, 4B:
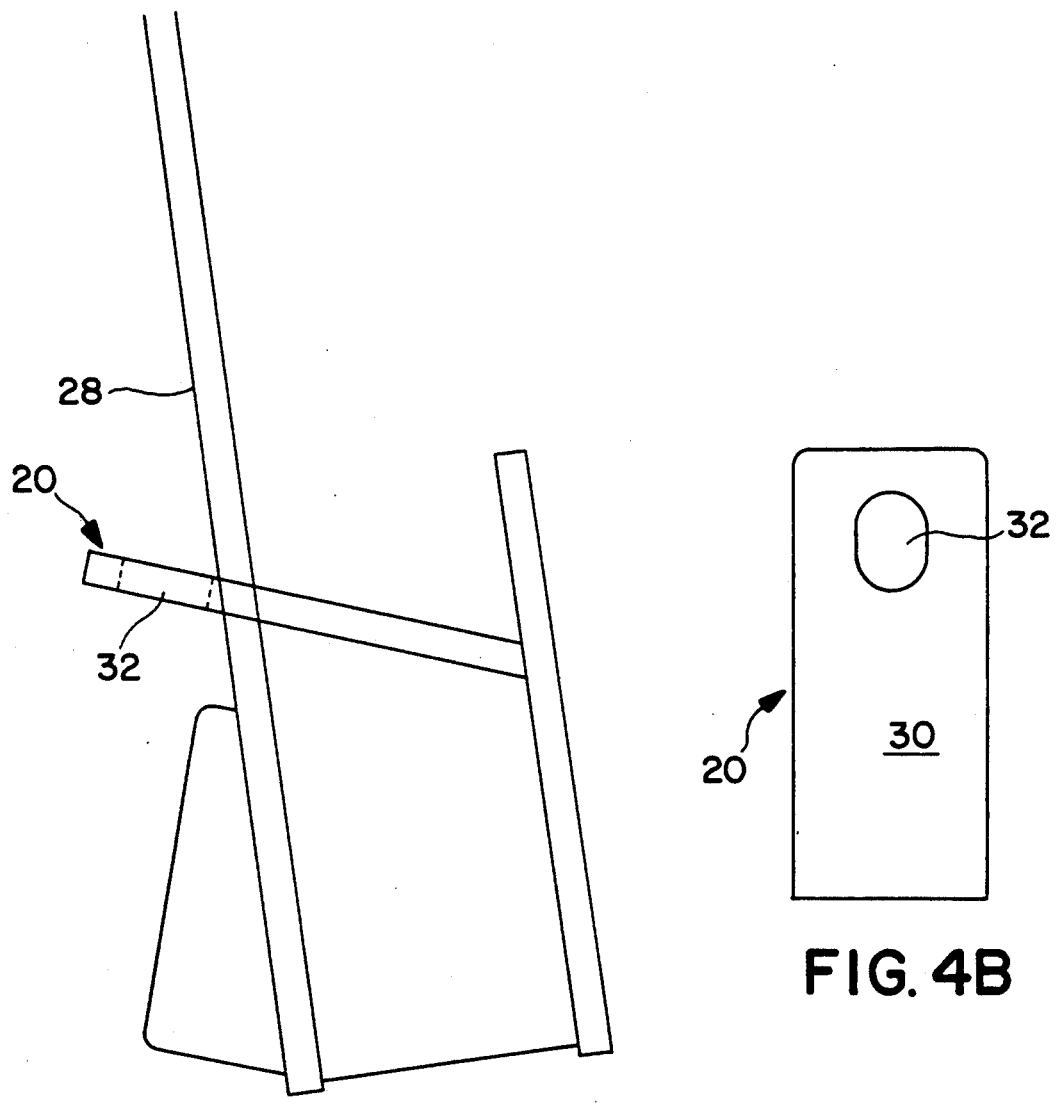
FIGS. 4A-4B illustrate a side view of the corn head showing a lower attachment point for the feeder housing extending rearwardly from the back of the corn head.

FIG. 4A-4B illustrate, in greater detail, the lower attachment element 20 (generally shown in FIG. 2) extending rearwardly from the rear wall 28 of the corn head 14. The lower attachment element 20 includes a generally longitudinally extending base portion 30 defining a receiving opening 32 therein. As will be discussed below, the receiving opening is employed to removably couple the lower portion of the corn head to a corresponding attachment element on the feeder housing by an adjustable connector element for removably mounting the head to the housing. The attachment element 20 is preferably formed from a durable metal.

FIG. 5 of the drawing illustrates a rear elevational view of a grain head modified in accordance with the present invention. The rear wall 34 of the grain head defines a generally central rectangular opening 36 leading to the feeder housing of a combine for passage of grain which is harvested by the combine. A pair of opposed brackets 38 is mounted to, and extend down from, the top surface 40 of the grain head. Each of the brackets 38 includes two openings 42 for receiving the complementary aligned mounting members 10 of the feeder housing (See FIG. 1). A pair of opposed guide members 44 extend downwardly from the top surface 40 of the grain head proximate to the mounting brackets 38. The guide members, which are separated by a distance corresponding to the width of the front of the feeder housing, are provided to assure that the openings 42 in the upper mounting brackets 38 are aligned with the mounting pins extending upwardly from the top surface of the feeder housing to initially removably mount the grain head to the feeder housing. A pair of opposed, laterally extending lower attachment elements 46 is mounted to the bottom surface 47 of the grain head. As illustrated in greater detail in FIGS. 6A and 6B each of the lower attachment elements 46 comprises a generally triangular shaped plate 48, preferably formed from a durable metal, and each attachment element defines an opening 50 proximate to the apex of the plate 48. The openings are adapted to receive a connector element for removably securing the lower portion of the grain head to the feeder housing.

Figure 7:
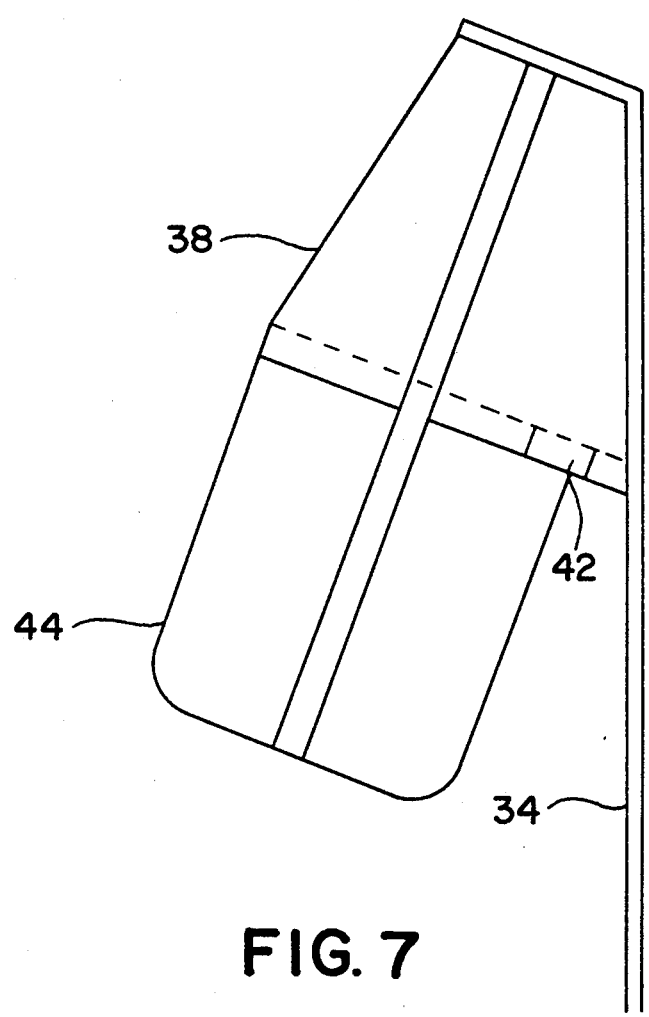
FIG. 7 illustrates a side elevational view of a portion of the grain head of FIG. 5 showing a mounting bracket and a guide element attached to the rear wall of the grain head.
Figure 9A:
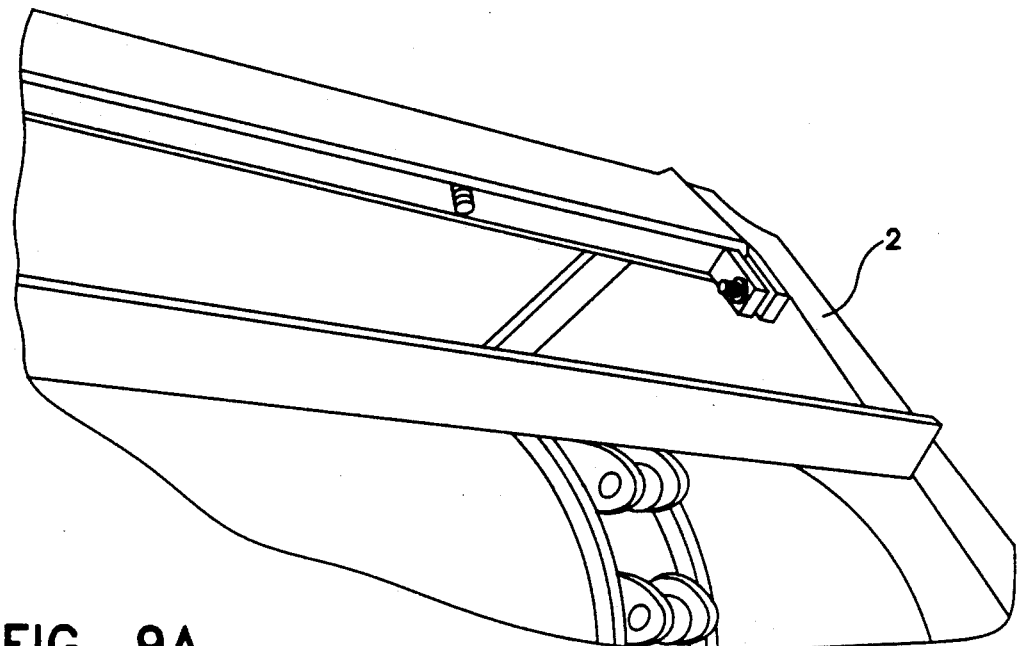
FIGS. 9A-9D, 10A-10C and 11A-11D illustrate functional and operative relationships between the modified feeder housing and the exchangeable harvester heads, in accordance with the present invention.
Figure 9B:
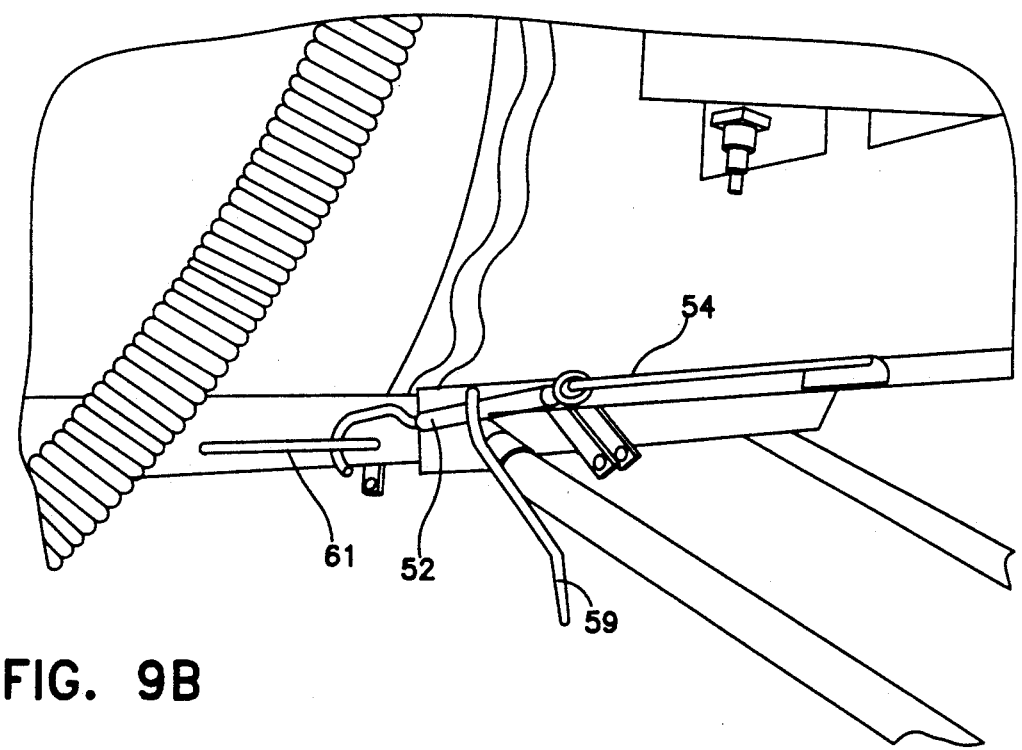
Figure 9C:
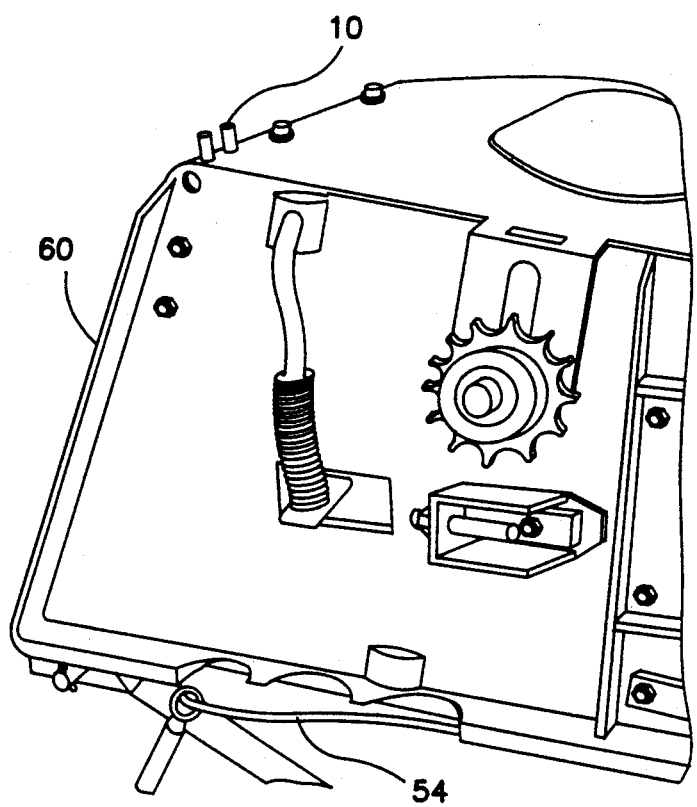
Figure 9D:
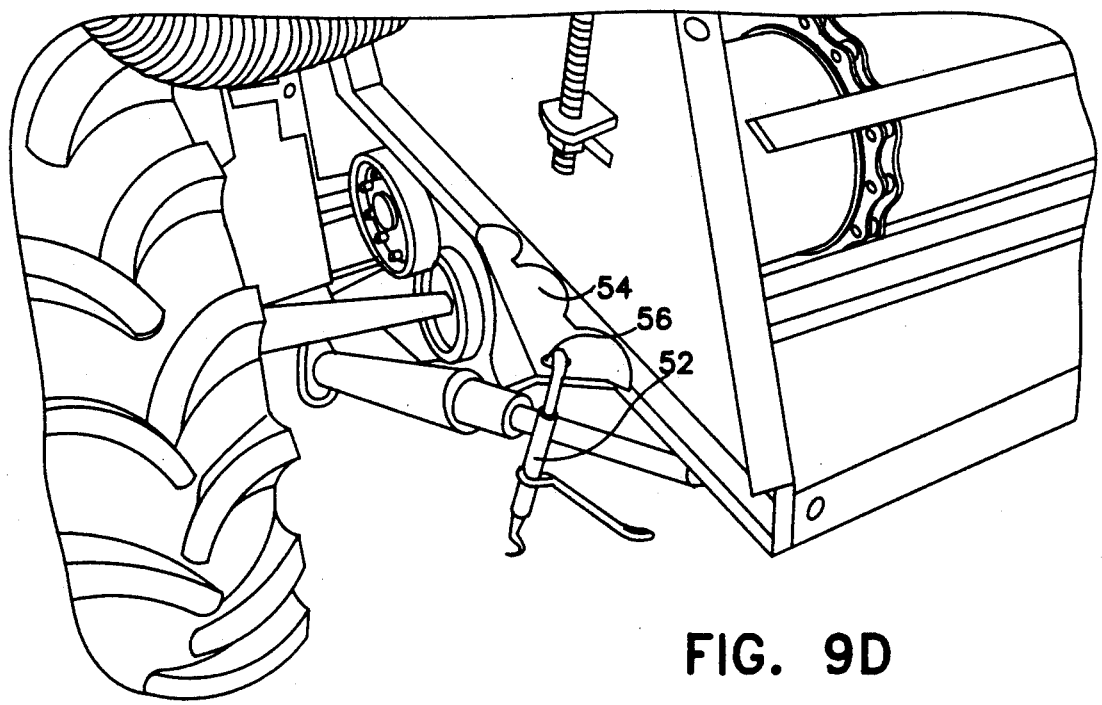

FIG. 7 represents a detailed side elevational view of the upper portion of the rear wall 34 of the grain head illustrating the mounting bracket 38 and guide element 44 extending rearwardly from the rear wall. FIG. 8 of the drawing illustrates a perspective view of a section of an upper corner of the rear surface of the rear wall 34 of the grain head showing the relationship between the mounting bracket 38 and the guide element 44. Reference numeral 36 illustrates the generally central rectangular opening illustrated by FIG. 5 and previously discussed herein.

FIGS. 9A–9D, 10A–10C, 11A–11D illustrate the operational relationship between the modified feeder housing, in accordance with the present invention, and the exchangeable harvester heads. Referring first to FIGS. 9A–9D, a connector element 52 is attached to a bracket 54 through an opening 56 defined therein. The bracket extends laterally from the lower sidewall 58 of the feeder housing of a combine, and the free end of the connector element is received within either opening 20 of the corresponding attachment element mounted to the lower portion of the corn head (See FIG. 2), or the opening 50 in the lower attachment element 46 of the grain head (See FIGS. 6A–6B). A tightening element 59 is mounted to the connector element for adjusting (decreasing) the distance between the ends of the connector element, after the free end thereof has been received in the attachment element of a head, to more firmly secure the head to the feeder housing.

FIGS. 9A–9D further illustrates the mounting pins 10 extending from the top surface of the feeder housing, and a reinforcement flange 60 provided on the seams of the feeder housing to enhance the structural integrity thereof. FIG. 9 further illustrates the mounting bracket 2 for supporting the mounting pins 10 affixed to the inner surface of the top of the feeder housing. Also illustrated is the connector element 52 with the tightening element 59 attached thereto in its operative position disposed between an attachment element (61) extending from the lower portion of the rear surface of a head and the corresponding attachment element 54 extending laterally from a side wall of the feeder housing.

Figure 10A:
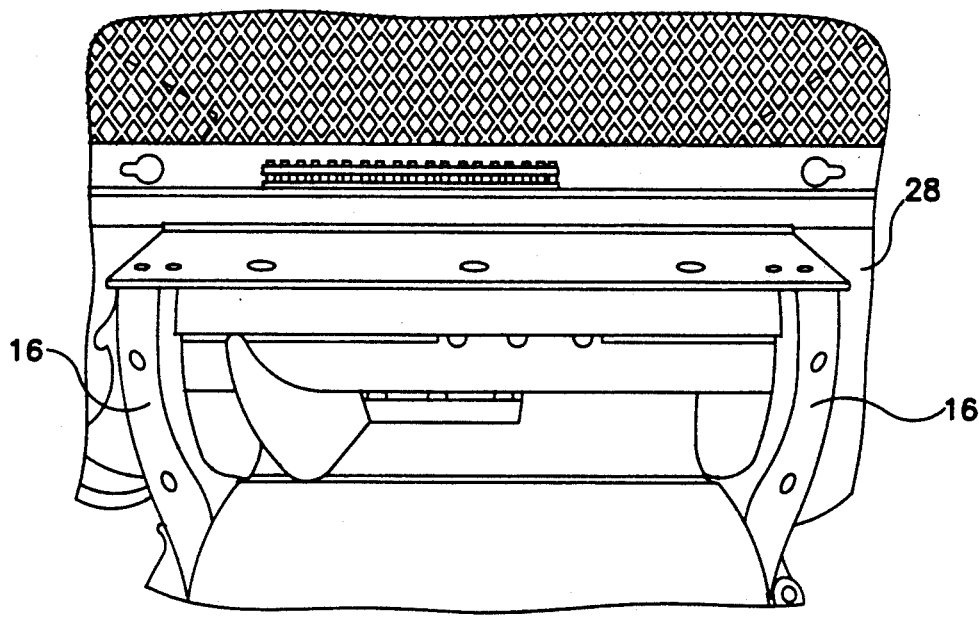
Figure 10B:
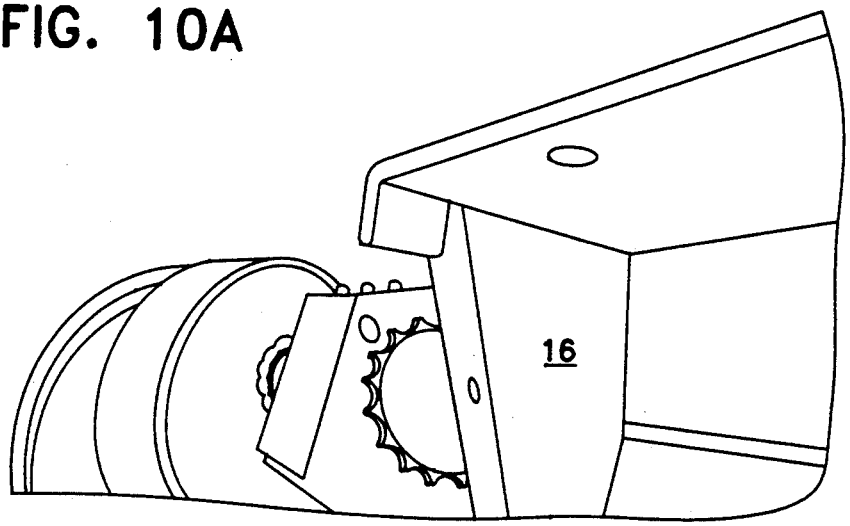
Figure 10C:
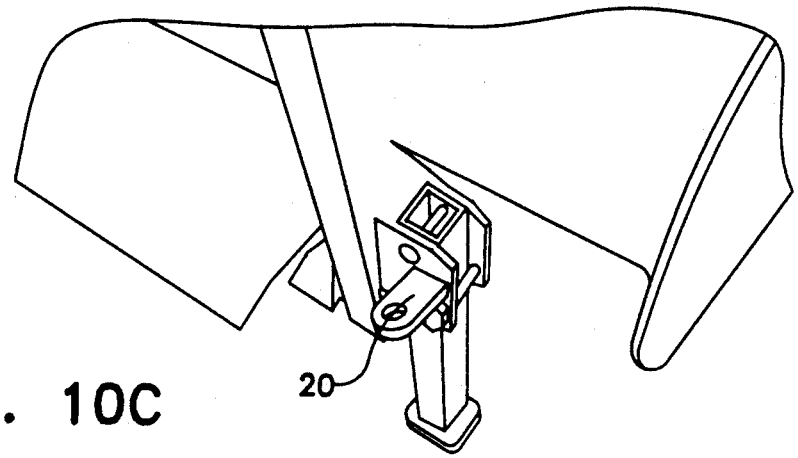

FIGS. 10A–10C further illustrates the rear surface of the rear wall 28 of a corn head, the upper guide elements 16 extending from the back of the cornhead, and the lower attachment elements 20 laterally extending rearwardly from the bottom portion of the back wall of the corn head.

Figure 11A:
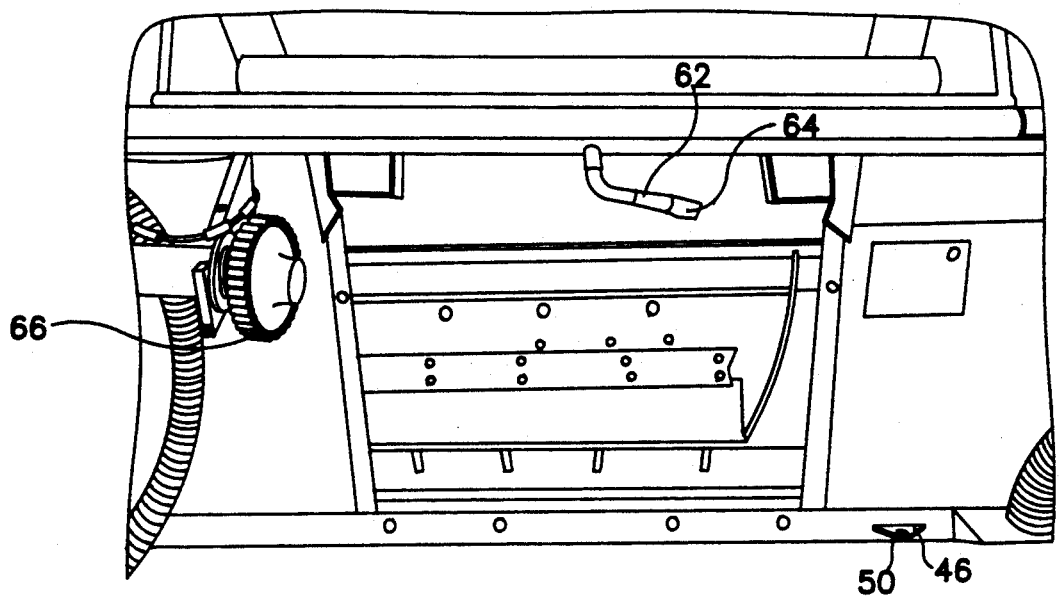
Figure 11B:
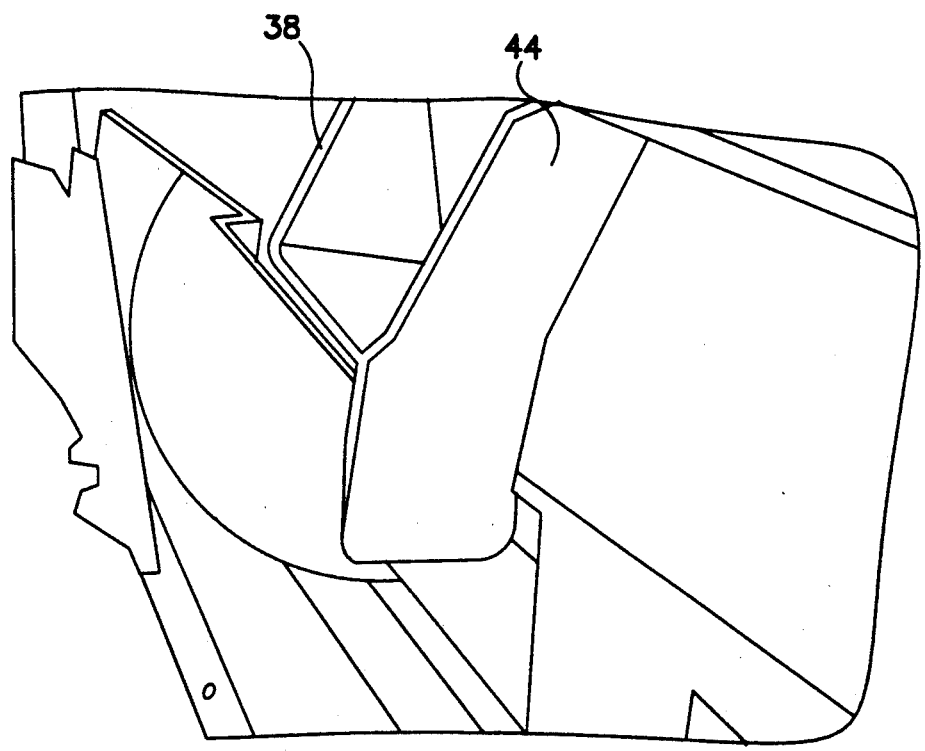
Figure 11C:
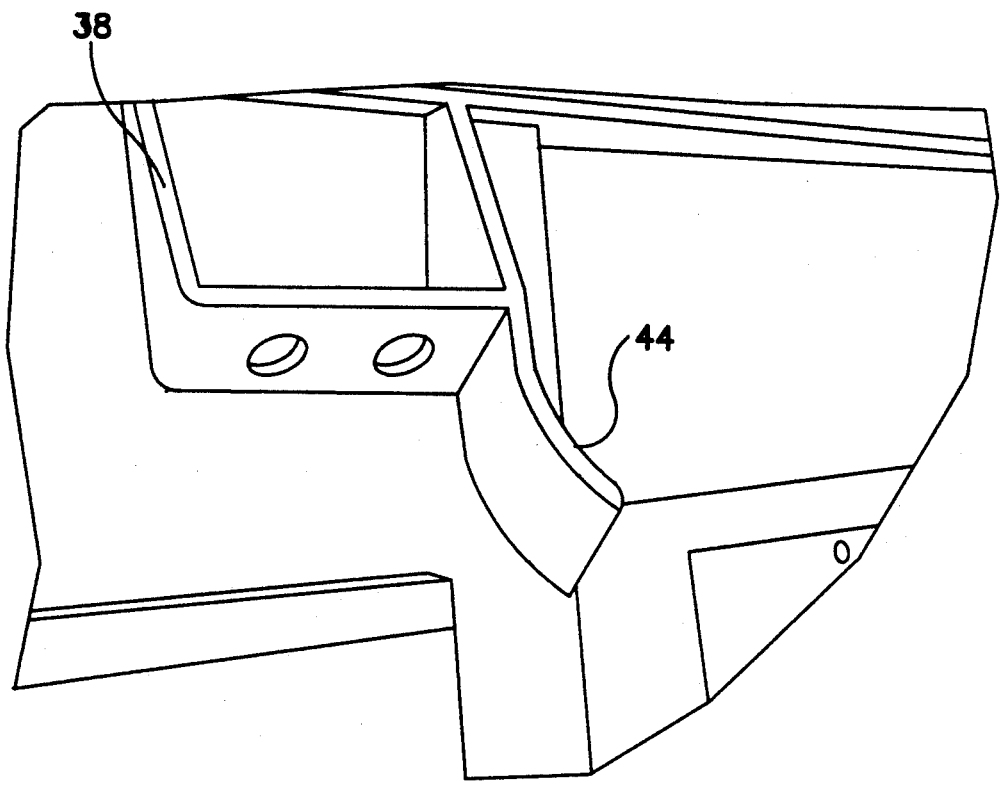
Figure 11D:
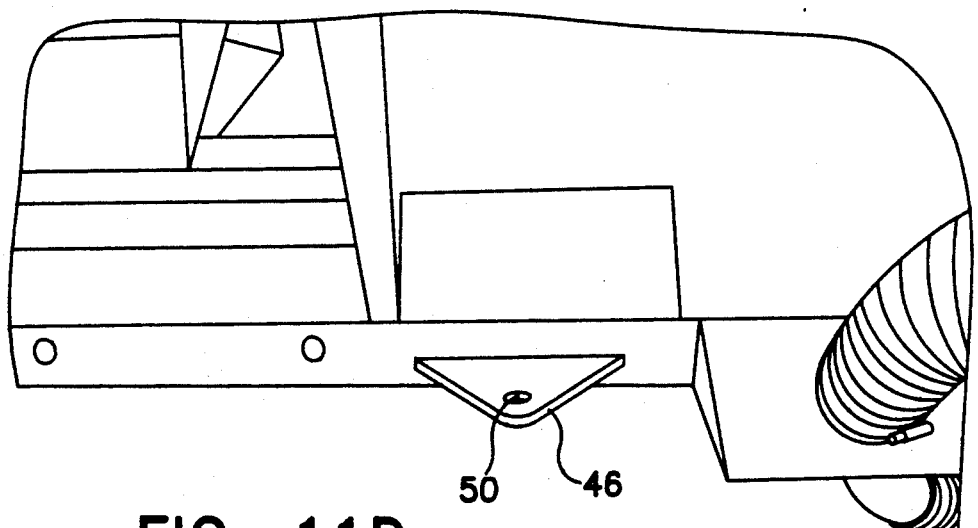

FIGS. 11A–11D illustrates the upper guide elements 44 and the mounting brackets 38 attached to the top rear surface of a grain head. A portion of a hose 62 is received within the grain head, and the free end of the hose is provided with a quick couple nozzle 64. The hose portion 62 is adapted to be connected to a corresponding hose portion extending from the feeder housing to complete a hose line connection between the head and the housing. FIG. 11D further illustrates a lower attachment element 46 having a central opening 50, such as that illustrated by FIG. 6A, mounted to the grain head. In this manner, the head may be removed from the housing without removing the entire hose line from the combine.

FIG. 11 also illustrates a sprocket 66 mounted to the grain head. A second sprocket is mounted to the feeder housing, and the two sprockets are mechanically coupled by an endless drive chain for powering the grain head. The use of the sprockets and the drive chain instead of a conventional V-belt pulley, enables the length of the driving chain to be readily adjusted by adding or removing chain links to compensate for any deviations in the distance between the housing sprocket and the head sprocket after one head has been exchanged for another.

The structure of the combine described above enables rapid replacement and exchange of a harvester head quickly, safely and efficiently by a single individual in a relatively short time interval, generally in the order of one half hour. The exchange of heads is accomplished without removing the feeder housing from the combine, as will now be described.

The connector elements coupling the lower attachment brackets on the feeder housing and the head are loosened by turning the attached tightener elements in a reverse direction to increase the distance between the ends of the connector. The hooks on the free ends of the connector elements are removed from the attachment elements of the head to disconnect the lower portion of the head from the lower portion of the feeder housing. The connector elements remain freely but permanently attached to the attachment elements of the feeder housing. The portion of the hose line extending from the feeder housing. The portion of the hose line extending from the feeder housing is disconnected from the portion of the hose line received in the head via the quick connect/disconnect nozzle. The endless drive chain coupling the respective sprockets on the feeder housing and the head is removed from the sprockets. Finally, the head is raised upward relative to the housing such that the top surface of the head is elevated above the top of the mounting members extending upwardly from the feeder housing to disengage the top of the head from the feeder housing. Any lug nuts or other removable fasteners used to secure the top surface of the head to the mounting pins must, of course, be removed from the mounting pins prior to removing the head from the housing. The head is thus removed from the feeder housing by a simple procedure in which the feeder housing itself remains assembled to the combine.

To mount a different head to the feeder housing, the replacement head is raised above the top surface of the feeder housing and then lowered onto the housing when the mounting pins extending upwardly from the housing are in alignment with the openings on the head. The guide elements on the rear surface of the head, which are separated by a distance substantially corresponding to the width of the feeder housing, assure that prompt alignment between the mounting pins extending upwardly from the housing and the openings in the top of the head will be quickly achieved. The head is initially coupled to the housing when the mounting pins of the housing are received within the openings on the top surface of the head. The head is retained in this initial mounted position by gravitational forces acting thereon, and may be further secured by lug nuts or other fastening elements removably mounted around the mounting pins extending above the top surface of the head. The lower portions of the head and the feeder housing are coupled together by placing the hook shaped free end of the connector element (permanently mounted at its other end to an attachment element on the feeder housing) into the opening in the lower attachment bracket extending from the rear surface of the head. The tightening element affixed to each connector element is used to firmly secure the lower portion of the head to the lower portion of the housing by reducing the length of the connector element. The free end of the hose portion extending from the feeder housing is coupled to the free end of the hose portion extending from the head to complete the hose connection between the head and the housing. The endless drive chain is then re-mounted around the respective sprockets on the housing and the head, and the length of the chain is adjusted, if necessary, to provide the desired tension by removing or adding links to the drive chain. The replacement head is now mounted to the combine without removal of the feeder housing, and the combine is operational.

It is apparent that the improved combine of the present invention advantageously enables efficient, quick and safe replacement or exchange of a harvestor head without removing the feeder housing from the combine. It is also apparent that pre-existing combines may be modified or retrofitted to result in the improved combine in accordance with the present invention. Other advantages, modifications and variations of the method and apparatus described herein within the scope of the invention will be apparent to those skilled in the art. Accordingly, the discussion of the preferred embodiments of the invention is intended to be illustrative only and not restrictive of the scope of the invention, that scope being defined by the following claims and all equivalents thereto.

I claim:

1. In a combine of the type for harvesting crops and including a head mounted to a feeder housing and non-removable therefrom when said feeder housing is mounted on said combine, the improvement comprising:
    an assembly for removably mounting said head to said feeder housing when said feeder housing is mounted on said combine,
    said assembly comprising upper mounting members carried by one of said head and said feeder housing, and corresponding upper mounting openings for receiving said upper mounting members in said other of said head and said feeder housing,
    said assembly further comprising at least a first lower attachment element mounted to said feeder housing, at least a second lower attachment element mounted to said head, and a connector element disposed between said first and said second lower attachment elements for removably coupling together the lower portion of said head and the lower portion of said feeder housing,
    said assembly for removably mounting said head to said feeder housing enabling exchange of one of said heads for another without removing said feeder housing from said combine.

2. The improvement of claim 1 wherein said upper mounting members are carried by and extend upwardly from said feeder housing, and said upper mounting openings are carried by said head.

3. The improvement of claim 2 wherein said upper mounting openings are defined in the head.

4. The improvement of claim 2 wherein said upper mounting openings are defined in at least one bracket mounted to said head.

5. The improvement of claim 1 further including guide means mounted to said head, said guide means adapted to align said upper mounting members and said upper mounting openings for removably mounting said head to said feeder housing.

6. The improvement as claimed in claim 5 wherein said guide means comprise a pair of spaced guide members mounted to the upper rear surface of a rear wall of said feeder housing, said guide members being spaced apart from each other a distance substantially equal to the width of a front wall of said feeder housing.

7. The improvement as claimed in claim 6 wherein said guide members are disposed proximate to said upper mounting openings of said head.

8. The improvement as claimed in claim 1 further including a first sprocket on said feeder housing, a second sprocket on said head, and a drive chain for mechanically coupling said first and said second sprockets for driving said head, said drive chain being adjustable in length for compensating for variations in the distance between said first sprocket on said feeder housing and said second sprocket on different heads exchangeably mounted to said feeder housing.

9. The improvement of claim 1 further including a hose line connecting said feeder housing and said head, said line comprising two hose sections including a first hose section mounted to said feeder housing and a second hose section mounted to said head, and means for removably coupling said first and said second hose sections together such that said head is removable from said feeder housing without removing said first hose section from said feeder housing.

10. The improvement of claim 1 wherein said first lower attachment element is mounted to and extends from a sidewall of said feeder housing, said second lower attachment element is mounted to and extends from a rear wall of said head, and said connector element disposed between said first and said second attachment elements includes means for adjusting the tension applied to said first and second attachment elements by said connector element.

11. A method for modifying a combine of the type in which a head is non-removably mounted to a feeder housing when said feeder housing is mounted on said combine to provide an assembly for removably and exchangeably mounting different heads to said feeder housing without removing said feeder housing from said combine, the steps of said method comprising:
    providing upper mounting members on one of said head and said feeder housing, and providing upper mounting openings for receiving said upper mounting members on said other of said head and feeder housing,
    mounting at least a first lower attachment element to said feeder housing, and mounting at least a second lower attachment element to said head, and
    removably connecting said first and said second lower attachment elements by a connecting element disposed therebetween.

12. The method of claim 11 wherein said upper mounting members are mounted to and extend upwardly from said feeder housing, and said upper mounting openings are carried by said head.

13. The method of claim 12 including the step of providing said upper mounting openings directly in said head.

14. The method of claim 12 further including the step of providing said upper mounting openings in said head by mounting at least one bracket having at least one opening to the upper portion of said head.

15. The method of claim 11 further including the step of mounting guide means to said head for aligning said upper mounting members and said upper mounting openings for removably mounting said head to said feeder housing.

16. The method as claimed in claim 15 wherein the step of mounting said guide means to said head includes the steps of mounting a pair of guide members to the rear surface of a rear wall of said feeder housing, and spacing said guide members apart from each other a distance substantially equal to the width of a front wall of said feeder housing.

17. The method as claimed in claim 16 further including the step of mounting said guide members proximate to said upper mounting openings carried by said head.

18. The method as claimed in claim 11 further including the steps of:
mounting a first sprocket on said feeder housing, and
mounting a second sprocket on said head,
mounting a drive chain on said first and second sprockets for mechanically coupling said head to said feeder housing, and
adjusting the length of said drive chain by removing or adding chain links to compensate for variations in the distance between said first and said second sprockets after one head has been exchanged for another.

19. The method as claimed in claim 11 further including the steps of:
connecting a first hose section of a hose line to said feeder housing,
connecting a second hose section of said hose line to said head, and
removably coupling said first and said second hose sections together to complete a hose connection between said feeder housing and said head such that said head is removable from said feeder housing without removing said first hose section from said feeder housing.

20. The method of claim 11 further including the step of adjusting the tension applied by said connector element on on said first and second lower attachment elements for said feeder housing and said head for coupling and uncoupling said first and second attachment elements.

* * * * *